June 13, 1939.                C. BORNMANN                2,161,909
                          ADJUSTABLE TRIPOD TOP
                    Filed March 10, 1937        2 Sheets-Sheet 1
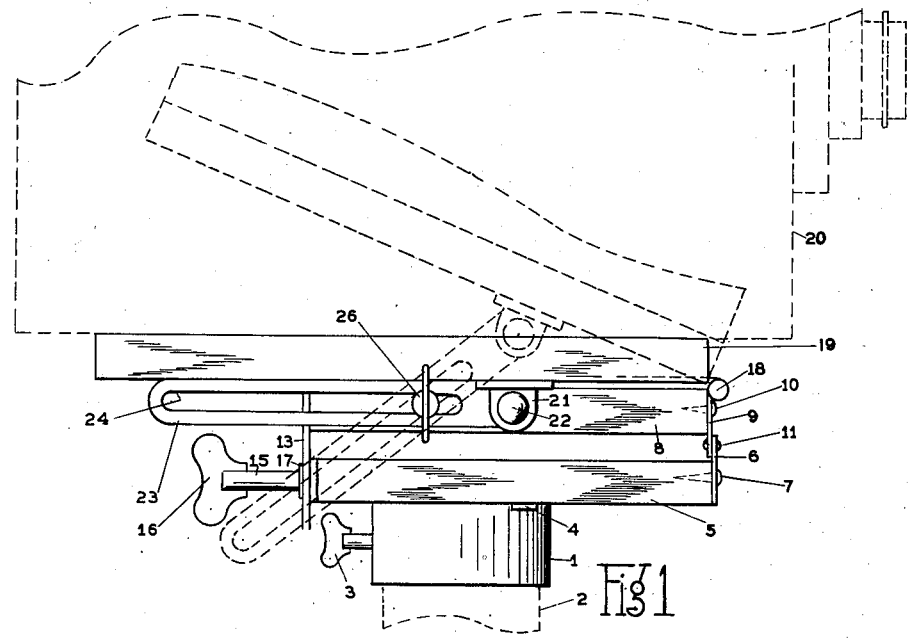
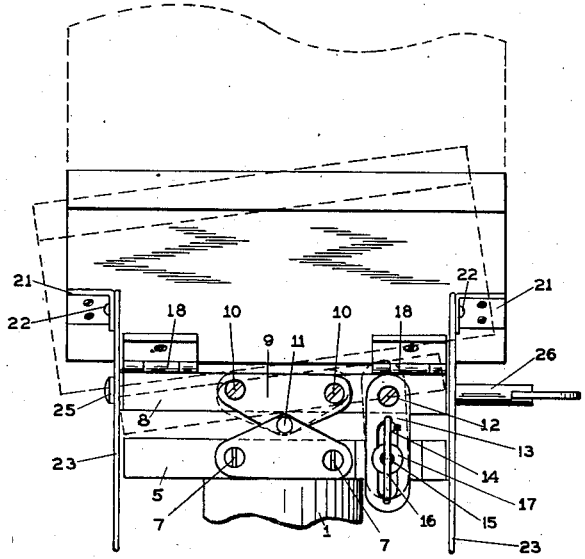
INVENTOR.
CARL BORNMANN
BY
ATTORNEY.

June 13, 1939. C. BORNMANN 2,161,909
ADJUSTABLE TRIPOD TOP
Filed March 10, 1937 2 Sheets-Sheet 2
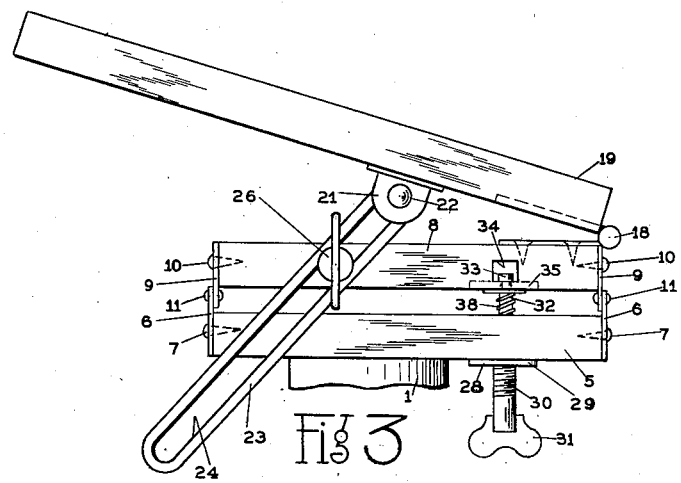
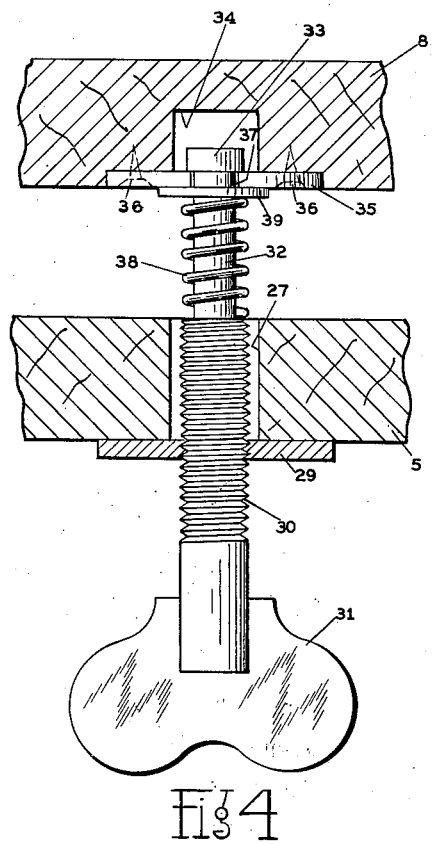
INVENTOR.
CARL BORNMANN
BY Philip S. Hopkins
ATTORNEY.

Patented June 13, 1939

2,161,909

UNITED STATES PATENT OFFICE 2,161,909

ADJUSTABLE TRIPOD TOP

Carl Bornmann, Binghamton, N. Y., assignor, by mesne assignments, to Agfa Ansco Corporation, Binghamton, N. Y., a corporation of Delaware Application March 10, 1937, Serial No. 130,138

6 Claims. (Cl. 248—184)

My invention relates to adjustable tripod tops and has for its primary object provision of a supporting means for cameras and other instruments which may be readily and quickly adjusted or tilted to various angular positions.

It has been previously known to provide a tripod top with a hinged supporting platen adjustable angularly in one direction in order to tilt the camera or other instrument thereon up and down in one plane. My invention is an improvement upon such construction in that it provides in addition a means for adjustably tilting the supporting platen laterally or in a plane at right angles to the above mentioned adjustment.

Another object of my invention resides in a simple and effective adjusting means together with means for securing the supporting platen in any adjusted position.

My invention is particularly useful for photographic cameras in that it enables the photographer to set up a tripod under adverse conditions of support and where it may be impossible or difficult to fix the tripod so that its supporting top is in exact horizontal position, for by my invention he can compensate for any angular displacement of the tripod by the aforementioned adjustments to bring the camera supporting member into exactly horizontal position.

Likewise in some instances it is necessary or desirable to quickly readjust a camera mounted on a tripod to focus on an object out of horizontal alignment and my improved top with its adjustments permits such angular disposition quickly and easily and secures the same adjusted position.

Other objects and advantages will appear as the description proceeds, reference now being had to the figures of the accompanying drawings forming a part of this application and wherein like reference numerals indicate like parts.

In the drawings Figure 1 is a side view of my improved tripod top showing position of adjustment thereof in dotted lines.

Figure 2 is a rear view of the top also illustrating in dotted lines one position of angular adjustment and one form of adjusting and securing means.

Figure 3 is a side view of my improved top illustrating a modified form of adjusting means.

Figure 4 is a detail sectional view of this modified adjusting means.

The reference character 1 refers to a socket or other fastening device by means of which my improved tripod top can be rigidly secured to the upper end 2 of a tripod of any conventional construction, and secured thereto as by means of the fastening screw 3. Secured to the socket 1 as by screws 4 is a plate 5. This plate 5 is provided at each end and centrally thereof with a pivot plate 6 secured to the plate 5 as by screws 7 and having a portion projecting beyond the upper surface of the plate 5.

A second plate 8 is provided and this plate likewise has at each end thereof a pivot plate 9 secured to the ends centrally as by the screws 10. The pivot plates 9 have their central portions projecting downwardly beyond the under surface of the plate 8 and are pivotally secured as at 11 to the upwardly projecting portions of the pivot plates 6. Thus the two plates 5 and 8 are pivotally connected centrally at their ends and in spaced relation whereby the upper plate 8 may be tilted angularly to one side or the other with respect to the lower plate 5, as shown in one position in dotted lines in Figure 2.

The upper plate 8 is provided at one end adjacent the pivot plate 9 with a screw 12 upon which is pivotally suspended a locking plate 13 provided with an elongated slot 14. This slotted plate 13 depends downwardly from its pivot 12 past the end of the lower plate 5. The lower plate 5 is provided in substantial registry with the locking plate 13 with a locking screw 15 provided with a finger piece 16 and a thrust washer 17 adapted to bind against the locking plate 13 when the screw 15 is turned in one direction and to thus firmly lock the upper plate 8 against tilting in relation to the lower plate 5. When the locking screw 15 is loosened and the pressure relieved from the thrust washer 17, the plate 13 is free to slide vertically and to swing laterally with the tilting of the upper plate 8, as shown clearly in dotted lines in Figure 2.

The upper plate 8 is hinged at one end as at 18 to one end of a supporting platen 19 provided with any conventional or suitable means for securing a camera 20 or other instrument thereon.

This supporting platen 19 is provided on its underside and adjacent each side edge with downwardly depending brackets 21 to which are pivoted as at 22 elongated locking arms 23 provided with slots 24. One side edge of the plate 8 is provided with a headed pin 25 engaging within the slot 24 of the adjacent locking arm 23. The opposite side edge of the plate 8 is provided with a locking screw 26 engaging in the slot 24 of the adjacent locking arm 23, whereby the supporting platen 19 can be rocked upon its hinge 18 and by the application of pressure of the locking screw 26 can be securely locked in any such adjusted angular position, as shown clearly in the dotted lines in Figure 1 and in full lines in Figure 3.

It will thus be seen that I have provided a tripod top for supporting cameras or other instruments which may be tilted from side to side and also tilted in a plane at right angles to such side-to-side adjustment whereby to provide a practical uniform angular adjustment to compensate for an irregular or uneven positioning of the tripod 2 or to line the camera or other instrument upon an object at an angle thereto and which is not possible by adjustment of the tripod itself.

In Figures 3 and 4 I have illustrated a modified form of means for tilting and locking the supporting head in its side-to-side adjustment. In this form the tripod socket 1, the lower plate 5, the upper plate 8, the pivot plates 6 and 9, the supporting platen 19 and its adjusting and locking arms 23, are all identical with those shown in the modification of Figures 1 and 2. In this form, however, the lower plate 5 is provided with an opening 27 therethrough (see Figure 4) and secured to the underside of the plate 5 as by screws 28 is a bearing plate 29 provided with a threaded opening in alignment with the opening 27. Threaded through this bearing plate 29 is an adjusting screw 30 provided with a finger piece 31 extending below the plate 5 and the opposite end of which adjusting screw is reduced in size and free of threads as at 32. The extreme upper end of this adjusting screw is provided with a head 33 lying within a recess 34 provided in the underside of the upper plate 8. The head 33 is suitably secured to the end of portion 32 of the screw, as by a threaded or pin connection, whereby it may be removed for assembly purposes. A thrust bearing plate 35 is suitably secured to the underside of the upper plate 8, as by the screws 36, and is provided with an opening 37 through which the reduced end 32 of the adjusting screw passes. The head 33 of the adjusting screw overlies the inner surface of the thrust plate 35 and is larger than the opening 37 in such plate.

A coil spring 38 encircles the reduced portion 32 of the adjusting screw and extends between the enlarged threaded portion thereof and a thrust washer 39 directly underlying the thrust plate 35.

Obviously upon rotation of the adjusting screw 30 in one direction, the head 33 will pull downwardly against the thrust plate 35 and cause the upper plate 8 to tilt downwardly, rocking on its pivots 11. Adjustment of the screw 30 in the opposite direction forces the thrust plate and upper plate 8 upwardly to tilt the latter in the opposite direction, the coil spring 38 normally urging such adjustment.

This modification of the side-to-side tilting means, while perhaps slower in operation than the means shown in Figures 1 and 2, permits a very fine and close adjustment as well as providing automatically for locking the plate 8 in its tilted position by means of the threaded screw 30 passing through the threaded opening in the bearing plate 29, without the necessity of a separate locking means.

It is believed that the operation of my invention is clearly apparent from the foregoing description. Of course changes may be made in details of construction and arrangement of parts without departing from the spirit and scope of my invention. I do not limit myself, therefore, to the exact form herein shown and described other than by the appended claims.

I claim:

1. A tripod top comprising a socket, a plate rigidly secured thereto, a second plate pivoted to said first plate above and in spaced relation thereto, said second plate being tiltable on its pivots, means associated with said plates for locking the upper plate in any tilted position, and a supporting platen pivotally secured to said upper plate.

2. A tripod top comprising a socket, a plate rigidly secured thereto, a second plate pivoted to said first plate above and in spaced relation thereto, said second plate being tiltable on its pivots, means associated with said plates for locking the upper plate in any tilted position, and a supporting platen hinged to said upper plate to tilt on an axis at right angles to the pivotal axis of said upper plate.

3. A tripod top comprising a member adapted for engagement with a tripod, a plate rigidly secured to said member, a second plate pivoted to said first plate above and in spaced relation thereto, said second plate being tiltable on its pivots, means associated with said plates for locking the upper plate in any tilted position, a supporting platen hinged to said upper plate for tilting on an axis at right angles to the pivotal axis of said upper plate, and means for locking said platen in any tilted position.

4. A tripod top comprising a member adapted for engagement with a tripod, a plate rigidly secured to said member, a second plate pivoted to said first plate above and in spaced relation thereto, said second plate being tiltable on its pivots, an element engaging said upper plate at one side of the pivot thereof, said element having engagement with said lower plate and being provided with a device for locking said upper plate in its tilted positions, and a supporting platen hinged to said upper plate.

5. A tripod top comprising a member adapted for engagement with a tripod, a plate rigidly secured to said member, a second plate pivoted to said first plate above and in spaced relation thereto, said second plate being tiltable on its pivots, an element engaging said upper plate at one side of the pivot thereof, said element having engagement with said lower plate and being provided with a device for locking said upper plate in its tilted positions, a supporting platen hinged to said upper plate, said tilting element and said locking device comprising an arm pivoted to said upper plate and having a slot therein extending past said lower plate, and a locking screw on said lower plate passing through the slotted arm and having means for binding said arm to said lower plate.

6. A tripod top comprising a member adapted for engagement with a tripod, a plate rigidly secured to said member, a second plate pivoted to said first plate above and in spaced relation thereto, said second plate being tiltable on its pivots, an element engaging said upper plate at one side of the pivot thereof, said element having engagement with said lower plate and having means for locking said upper plate in its tilted positions, a supporting platen hinged to said upper plate, said tilting element and locking means comprising a screw threaded through a bushing in said lower plate, the upper end of said screw being rotatably secured to said upper plate.

CARL BORNMANN.